United States Patent [19]

Fathauer

[11] 3,928,751

[45] Dec. 23, 1975

[54] SEED POPULATION MONITOR

[75] Inventor: George H. Fathauer, Decatur, Ill.

[73] Assignee: Dickey-john Corporation, Auburn, Ill.

[22] Filed: Aug. 19, 1971

[21] Appl. No.: 173,137

[52] U.S. Cl. ....... 235/92 PK; 235/92 DN; 235/92 R; 235/92 V; 235/98 C
[51] Int. Cl.² ......................................... H03K 21/36
[58] Field of Search. 340/239 R; 235/92 PK, 92 PC, 235/92 DN, 98 B

[56] References Cited
UNITED STATES PATENTS

| | | | |
|---|---|---|---|
| 3,422,776 | 1/1969 | Gregory | 235/98 B |
| 3,510,632 | 5/1970 | Strandberg | 235/92 DN |
| 3,527,928 | 9/1970 | Ryder | 235/92 PK |
| 3,586,835 | 6/1971 | Foeh | 235/92 PK |

Primary Examiner—Joseph M. Thesz, Jr.
Attorney, Agent, or Firm—Olson, Trexler, Wolters, Bushnell & Fosse, Ltd.

[57] ABSTRACT

A seed population monitor for a planter senses seeds for each row being planted. A seed counter counts the seeds for a row being planted over a predetermined distance of travel by the planter and a read-out is provided in seeds per unit of area. The monitor provides for automatically sequencing from row-to-row for the predetermined distance interval or for repeatedly monitoring a selected row over the distance interval. For row-to-row monitoring a flashing lamp indicates the row for which the count is being displayed while at the same time the count for the next row is being made. A set point alarm is provided for each row to indicate if the seed rate thereof falls below a preselected amount.

16 Claims, 7 Drawing Figures

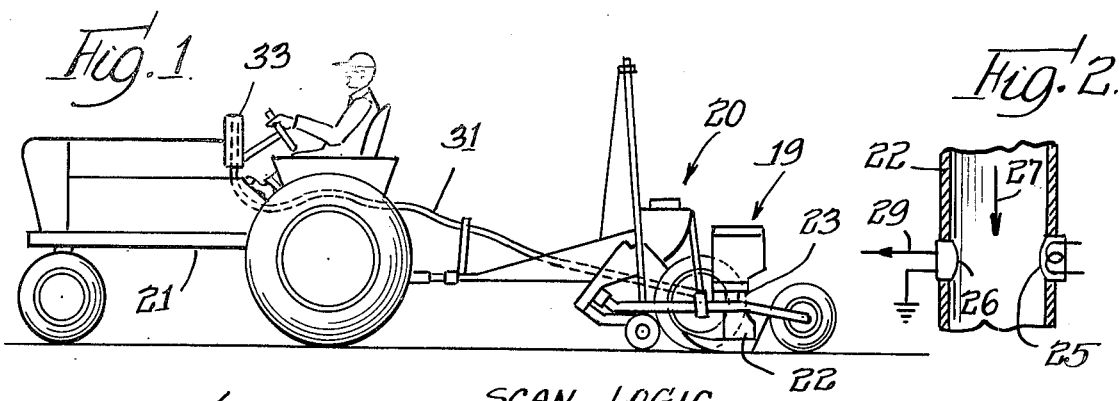
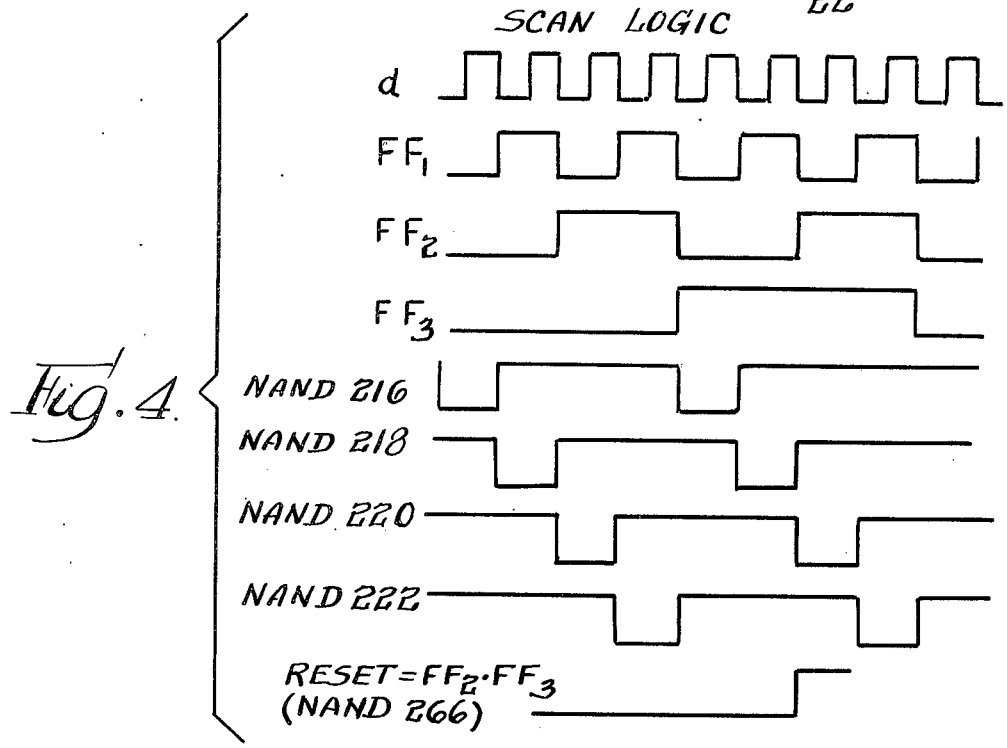
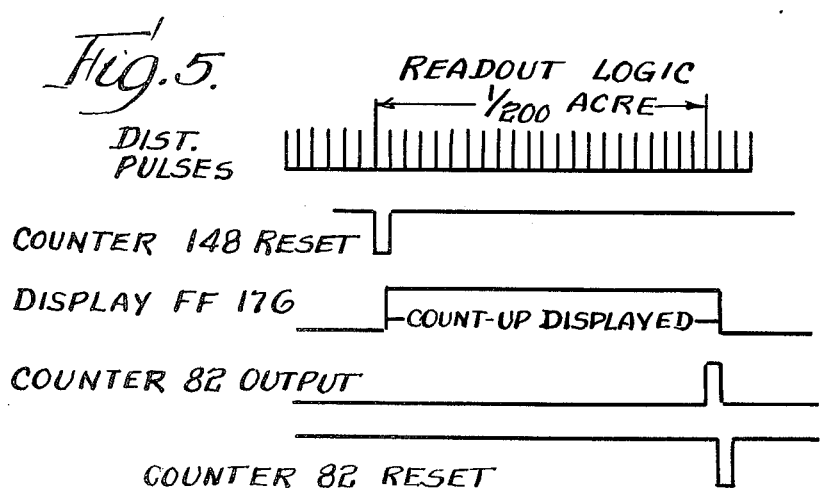

SEED POPULATION MONITOR

BACKGROUND OF THE INVENTION

This invention relates to improvements in the monitoring of seeds being planted.

In the planting of seeds with multi-row, tractor-drawn planters, it is difficult for the farmer to know if the seeds are being planted in accordance with the planned seed population. Various malfunctions of the planter that prevent planting of one or more of the rows continuously or intermittently can reduce the seed population. However, even if the planter embodies an arrangement for detecting the planting of the seeds for each row, such arrangement does not give the farmer a constant indication of the number of seeds being planted per unit of area.

OBJECTS AND SUMMARY OF THE INVENTION

It is an object of the present invention to provide a seed population monitor which is capable of counting the seeds being planted over measured distances and to display visually the seed population in terms of seeds per acre or other unit of area. In countries using the metric system the read-out could be in seeds per hectare.

A further object of the present invention is to provide a seed population monitor of the type stated which is capable of being used with planters of different row spacing as well as with planters of various numbers of rows.

A still further object of the present invention is to provide a seed population monitor of the type stated which gives both audible and visual indication of a planting malfunction for each row of the planter.

Another object of the present invention is to provide a seed population monitor of the type stated which is capable of monitoring the seed population per unit of area for each of the rows of the planter in sequence, or for any selected row of the planter repetitively. If any row of the planter is not producing the required population read-out, the malfunction of the planter can be corrected.

In accordance with the foregoing objects the seed monitor comprises sensing means for simultaneously sensing seeds of each row being planted. A seed counter is responsive to the sensing means for determining a seed count in a row and there is a read-out device for the seed counter. A second or distance counter is also employed. Input pulses are applied to the distance counter, the input pulses being a function of the distance traveled by the planter. The distance counter produces an output signal when the planter has traveled an ascertained distance. Upon issuance of the output signal from the distance counter, the seed counter is reset and causes a display of data representing the count of the seed counter to appear at the read-out device such that the read-out of the counter at the end of such ascertained distance represents a measure of the seed population per unit of area being planted over that ascertained distance. The arrangement further provides for automatically sequencing from row to row (sometimes referred to as the "scan mode") and displaying on the read-out device the population for the preceding row during the time when the next row is being counted. The sequencing is carried out by means including a sequence counter that controls a flashing lamp so that the farmer knows which row is being read out. The sequence counter can be preset with a row switch so that any selected row can be repetitively monitored for population read-out. This enables the farmer to check a selected row which may be suspected of having some mechanical difficulty. Regardless of whether or not the system is operating in the scan mode or in the selected row mode, the distance counter is reset and preset for another distance count following the issuance of its output signal. The system also employs an area counter that triggers a read-out device, such as a mechanical counter, for indicating the total area that has been planted. The calibration of the area counter and its read-out device may be such that the area read-out is in acres.

The system also incorporates a set point alarm which may be triggered when the seeds planted per unit of distance falls below a preset rate. The set point alarm is controlled by a voltage that is derived from a series of pulses that are proportional to the distance traveled by the planter. A set point alarm is provided for each row so that each may be monitored independently of the other.

BRIEF DESCRIPTION OF THE FIGURES

FIG. 1 is a side elevational view of a tractor-drawn planter embodying a seed population monitor in accordance with the present invention;

FIG. 2 is a fragmentary sectional view, somewhat diagrammatic in form, of one of the sensing devices for detecting seeds being planted;

FIG. 4 shows wave forms at certain portions in the system when the system is in the scan mode; and FIG. 5 shows wave forms of the population read-out logic associated with start up or resetting the row selection switch.

DETAILED DESCRIPTION

Figure 3A:
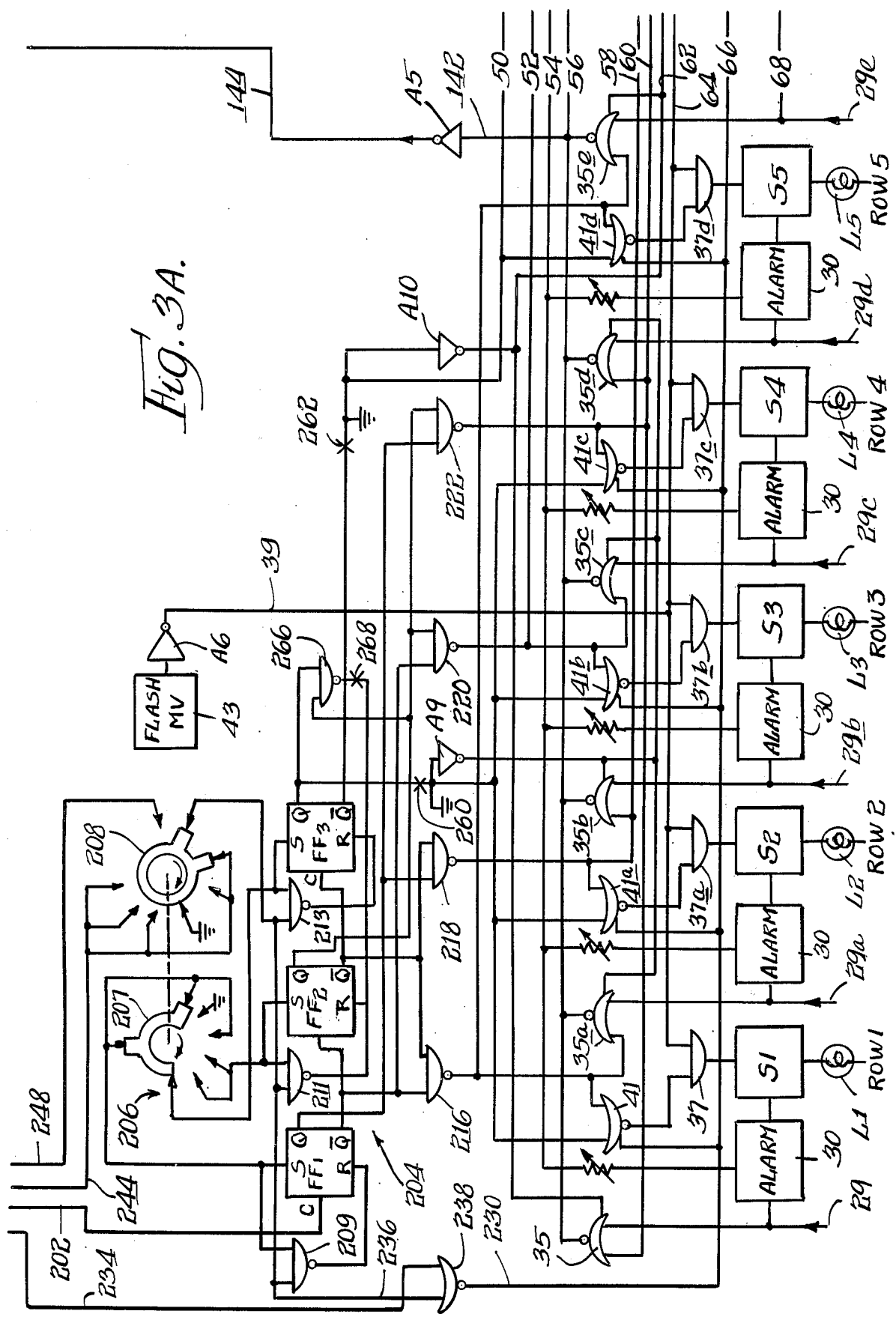
FIGS. 3A, 3B and 3C, taken together, show a block and logic diagram of the seed population monitor of the present invention.

Referring now in more detail to the drawing, FIG. 1 shows a planter 20 for planting corn or other seeds and being drawn in the usual manner by a tractor 21. The planter 20 may be of the four, six or eight row type. However, for purposes of the present description, it will be assumed that the planter 20 is of the eight row type. The planter 20 includes a hopper 19 and a feed mechanism 23 for delivering seeds one at a time through a boot 22. Within the boot 22 is a seed sensing or detecting device comprising a light source 25 and a photo-cell 26, both being conventionally powered. A boot 22 and associated sensor made up of the light source of the photo-cell are provided for each row of the planter. Therefore, a seed dropping through the boot as indicated by the arrow 27 will, for each row, pass between the light source 25 and its associated photo-cell 26 to generate a pulse on conductor 29. The output conductor 29 for each photo-cell 26 may be formed into a cable 31 for transmission of the signals to a seed monitor device shown in FIGS. 3A–3C, the components of which are housed in a console 33 suitably located for view by the tractor operator.

Assuming that the sensor shown in FIG. 2 is for row 1 of the planter, it will be seen that in FIG. 3A (lower left) the seed sensing signal on conductor 29 is sent to a set point alarm 30 and also to a NOR gate 35. The output from the alarm circuit 30 may be sent to a Schmitt trigger S1, and the output of the Schmitt trigger S1 is used to operate lamp L1 corresponding to Row R1. The outputs from the photo-cells for the other planter rows are shown as 29a, 29b, etc., with their associated Schmitt triggers S1, S2, etc., NOR gates 35a, 35b, etc., and lamps L2, L3, etc., corresponding to the respectively numbered rows. Also, as shown in FIGS. 3A and 3C, there is a set point alarm 30 associated with each row. The set point alarm 30 may be of any known type and need not be described in detail. The arrangement may be of the type shown in Fathauer et al. application Ser. No. 10,930, filed Feb. 12, 1970, now Pat. No. 3,723,989 and assigned to the same assignee as is the present application. Power is supplied to NOR gates 35, 35e, 35f, 35g upon turn-on of amplifier A10, while NOR gates 35a, 35b, 35c, 35d are supplied upon turn-over of inverter amplifier A9. The Schmitt triggers S1, S2, etc., are used to operate the alarm lamps L1, L2, etc., not only when a signal is received from the associated alarm circuit 30, but also when signals are received from associated AND gates 37, 37a, 37b, 37c etc. These AND gates operate in a sequence in the scan mode of the system or in a selected repetitive fashion in the row select mode, all as will hereinafter be more fully described. Suffice it to say for the present that the AND gates 37, 37a, etc., operate when signals are received on conductor 39 (FIG. 3A) and from associated NOR gates 41, 41a, 41b, etc. Signals in the form of pulses at about one per second for flashing the lamp will appear on conductor 39 from a continuously operating, free running multivibrator 43 that drives amplifier A6.

To facilitate reading FIG. 3A with FIG. 3C, conductors 50 through 68, inclusive, have been identified on each of those two figures. In addition, conventional logic symbols are used throughout the drawing.

As shown in FIG. 3C, the system employs a distance measuring wheel 70 which engages the ground and which may be mounted at any suitable position on the planter. For example, the wheel 70 may be mounted on the sill bar of the planter. The distance wheel 70 actuates a sensor 72 which issues pulses in proportion to the distance traveled by the distance wheel, and hence the distance traveled by the planter. The pulse generating sensor 72 may be of any known type, for instance a reed switch that is repeatedly closed by a magnet rotatable with the distance wheel 70. The closing of the reed switch (which is in a circuit supplied by electric current) produces an output pulse that is sent into amplifier A7 and from there into one-shot multivibrator 74. The output signal from the multivibrator 74 is sent through potentiometer 76 and to amplifier A12 and over conductor 78 to the set point alarms 30. The circuitry from the sensor 72 through to conductor 78 develops a control voltage which is directly proportional to the pulse rate from the sensor 72. This control voltage is in turn proportional to the distance rate of the planter. The potentiometer 76 permits a pre-setting of the slope of this distance voltage as a function of the distance rate, which results in a pre-setting of the number of seeds per unit of distance below which the voltage on conductor will result in activating the alarms 30 and lamps L1, L2, etc. for each row.

The distance pulses issuing from the multivibrator 74 are sent over conductor 80 (FIG. 3C and FIG. 3B) to the first flip-flop of a distance counter 82. The distance counter 82 is shown to be an eight stage pre-settable counter with the flipflops 84 through 96, inclusive, being connected, as shown. The flip-flops of the counter 82 may be strobed or re-set by a signal on conductor 100 from AND gate 102. The terminals of the flip-flops that are adjacent to the numerals within the boxes of the diagram are the pre-set terminals. These pre-set inputs are linked with the pre-set inputs of the flip-flops of a total area counter 104 shown in FIG. 3C. The read-out is in acres but this may be hectares for countries using the metric system. This counter 104 has flip-flops 106 through 118, inclusive, as shown. The purpose and operation of the counter 104 will later be described. Suffice it to say for the present, however, that the pre-set inputs of the last seven flip-flops of the counter 82 and the flip-flops of the counter 104 are connected as shown by conductors 120 through 132 inclusive, reference being made for clarity to FIGS. 3A and 3C, wherein the reference numerals are shown in both figures.

The distance counter 82 produces an output pulse on conductor 140 after a predetermined number of distance input pulses have been received from conductor 80. The counter 82 is programmed so that the output pulse on conductor 104 represents a predetermined distance traveled and with a predetermined planter width. The calibration of the ground wheel is known, and the ground wheel is assumed to remain in peripheral engagement with the ground. Consequently, an input pulse to counter 82 issues for a known distance of travel of the planter. The pulse on conductor 140 represents an ascertained area such as the acreage covered in the distance interval. For example, each output pulse on conductor 140 may represent 1/200th of an acre, and so the seeds counted during this interval represents the seeds per 1/200th of an acre.

As heretofore indicated, seed counting may be effected in a sequence row-by-row for each ascertained distance interval. Seed counting may also be carried out repeatedly for the same row. Thus, the pulses on row 1 and appearing on conductor 29 (FIG. 3A) is sent through NOR gate 35 and over conductor 142 through amplifier A5 and from there over conductor 144 (see FIG. 3A, 3B) to amplifier 146. The output of amplifier 146 drives a seed counter 148 which, as shown, consists of a quinary counter and two decade counters. It will also be noted that the other sensor input conductors 29a, 29b, etc. are connected through their associated NOR gates 35a, 35b, etc. to conductor 142. Consequently, when NOR gate 35a, 35b, etc., as the case may be, is on by reason of power being supplied thereto, the seedcount pulses for the particular row will appear on conductor 142 and will be fed into the seed counter 148. As pointed out before, in the embodiment herein disclosed, the output pulse from the counter 82 on conductor 140 corresponds to a distance of 1/200ths of an acre. However, since a read-out of seeds per 100th of an acre is desired for read-out device 150, the seed pulse input to the quinary counter results in a count of two for each seed pulse. Thus, the first stage 149 of device 150 is a "2's" readout.

The binary output of each stage of the seed counter 148 is sent to a storage device 152 which comprises the three quad latches shown. These latches maintain a pre-set count until reset or enabled upon command. The outputs of the quad latches are sent to decoders 154 for decoding the data so that a visual read-out at a conventional read-out device 150 may be obtained. The read-out device 150 may be of any known type that is suitable for read out by the operator of the tractor.

Figure 3B:
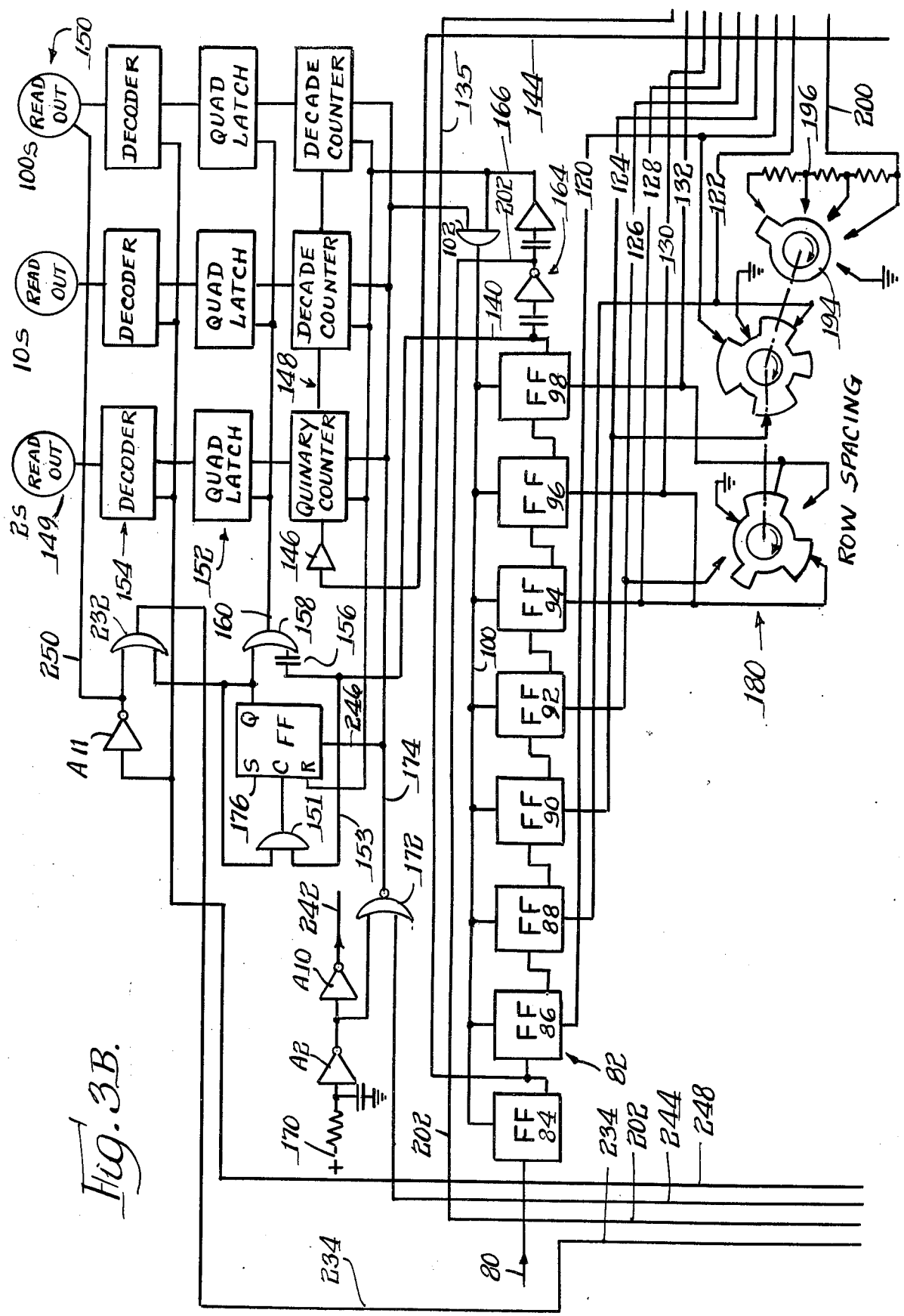
Figure 3C:
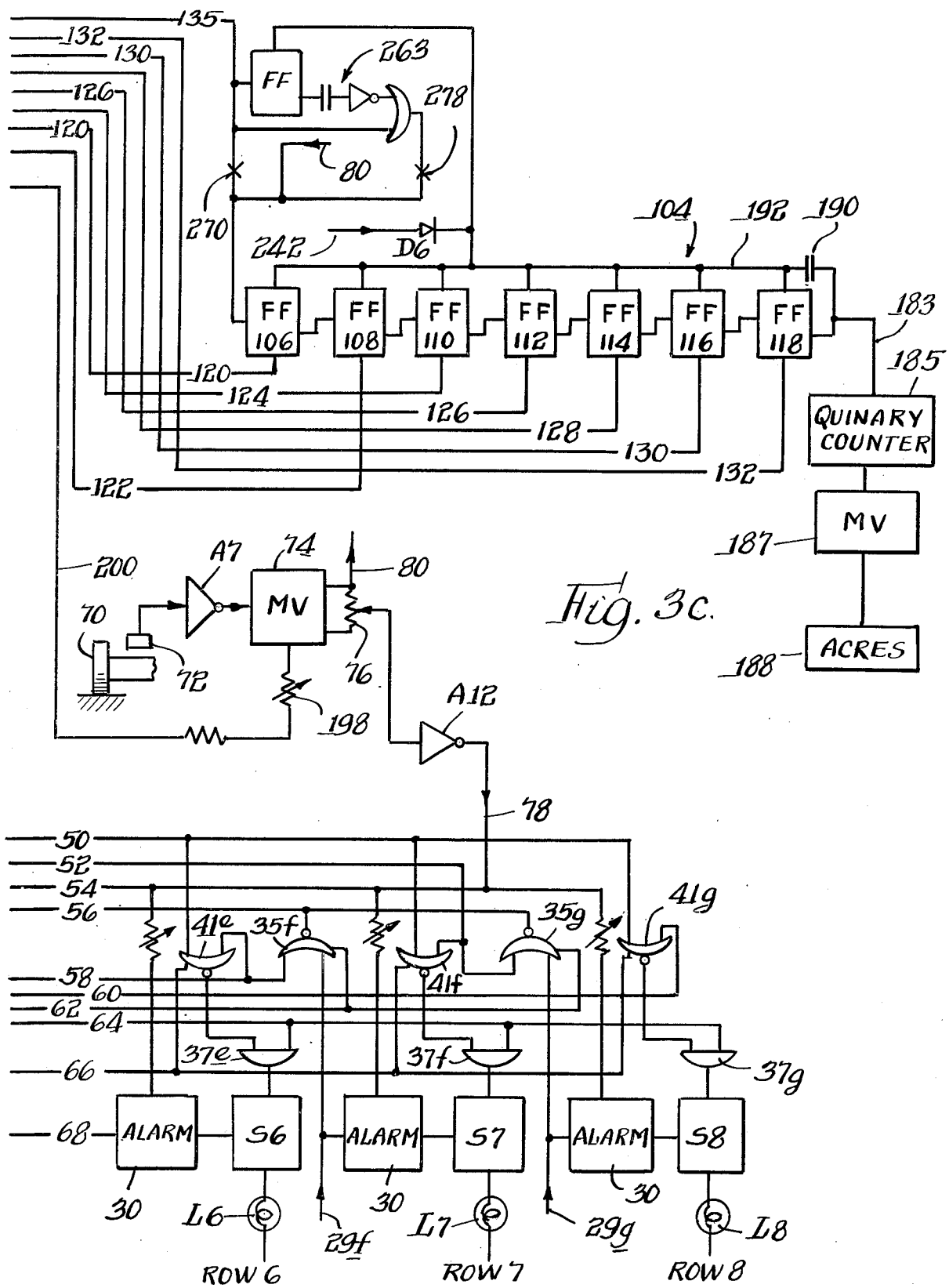

Referring to FIG. 3B, it is seen that the distance counter signal output on conductor 140 is sent through differentiating capacitor 156 to OR gate 158. The output signal on conductor 160 from OR gate 158 operates the latches to receive the data from the seed counter 148. The latches operate in the read through condition so that when a signal is applied on conductor 160 the seed count from the counter 148 will be displayed in the readout device 150. Since the signal on conductor 160 appears at the end of the predetermined distance interval, the accumulated seed count in the counter 148 for that distance interval will, at that time, be read into the latches. This will give an indication of the number of seeds per acre planted for a particular row over that distance interval. The signal on conductor 140 also applies an input pulse via conductor 153 to AND gate 151, the output of which is connected to the clock C of the display flip-flop 176, and for purposes later described.

After a short time delay following the pulse on conductor 140, the seed counter 148 is reset and the distance counter 82 is reset and preset so that a new seed count and a new distance count may be received. As seen in FIG. 3B, a circuit 164 comprises the two capacitors and the two amplifiers shown. This circuit 164 provides delay, differentiation, and amplification functions. The output signal on conductor 166 strobes or resets the seed counter 148. The distance counter 82 is strobed or reset by a signal over conductor 100 from AND gate 102 which has an input from conductor 166. The other input to the AND gate 102 is present through NOR gate 172 when the device is on as by power from 170.

When the counter 82 has been reset, as aforesaid, it is preset through inputs via conductors 122, 124, etc., in accordance with the position of a row spacing switch 180 (FIG. 3B). The row spacing switch is programmed so that the counter 82 will produce an output pulse on conductor 140 at the end of 1/200th of an acre for various spacings of rows that are planted by different planters. This enables the device to be installed on various makes of planters. Thus, the row spacing switch 180 is set in accordance with the row spacing of the planter with which the device is used. The contacts that engage the two ganged rotary switch elements shown apply preset signals of state 0 from the ground shown through the switch elements and contacts to the indicated flip-flops of the counters 82 and 104 so that those two counters are preset together. In effect, therefore, the preset of the counters 82, 104 increases or decreases the number of distance input pulses required for an output pulse from each counter 82, 104 to result. For wide spacings of the planter rows, the seed population for a given distance traveled by the planter will be less than if the rows are close together, and vice versa.

In an eight-row planter, the distance pulses from conductor 80 (FIG. 3C) are applied to the first flip-flop 106 of area counter 104. In the form of the invention herein described, the counter 104 produces an output pulse on conductor 183 for every two one-hundredths of an acre covered. This output pulse on conductor 183 is applied through quinary counter 185 which drives multivibrator 187 which in turn operates an electromechanical counter 188. The quinary counter performs a divide by five function. This counter reads the total area planted in acres. When an output pulse is issued on conductor 183 the output pulse is differentiated through capacitor 190 and appears on conductor 192 to strobe or reset the area counter 104. In the present example, the area counter 104 is reset after each 2/100ths of an acre.

Referring to FIGS. 3A and 3B, it is seen that a rotary switch member 194 is ganged with the row spacing switch 180 for selective engagement with one of a series of contacts of a resistor 196. This selects the proper resistance to program the distance multivibrator 74 to change the output voltage thereof proportionally for different row spacings. A calibration resistance 198 may also be present in conductor 200. The resistance 196 thus keeps the population setting potentiometer 76 correct for different row spacings so as to maintain the lamp and alarm signalling point correct in terms of population.

Referring to FIG. 3B, the output of the distance counter 82 is also sent over conductor 202 to a sequence counter generally designated at 204. The output signal on conductor 202 is delayed relative to the signal on conductor 140 by the circuit 164. The sequence counter 204 comprises a three-stage binary counter having the three flip-flops FF1, FF2, FF3 shown. Consequently, the sequence counter 204 is stepped by the distance interval pulse on conductor 202. The sequence counter 204 operates in conjunction with a row select switch 206 having a pair of rotary switch elements 207, 208 and the fixed contacts shown. Operation of the switch 206 places ground on the fixed contacts as determined by the position at which the switch is set. The sequence counter 204 also operates in conjunction with NAND gates 209, 211, 213, the outputs of which are connected to the R inputs of the respective flip-flops FF1, FF2, FF3. The flip-flops FF1, FF2, FF3 are of the J-K configuration but without using the usual J and K inputs. The clock inputs C are used along with R and S inputs and the Q and $\bar{Q}$ outputs. If S and R are at state 1 then Q and $\bar{Q}$ toggle with the clock. Independently of the clock, if S is at state 0, then Q is at state 1; if R is at state 0, then $\bar{Q}$ is at state 1.

The binary outputs of the sequence counter 204 are combined through associated NAND gates 216, 218, 220, 222. NAND gate 266 is used only for six row operation, later described. Assuming that the selector switch 206 is in the scan mode, as shown in the drawing, the output wave forms are as shown in FIG. 4 adjacent to the respectively identified flip-flops FF1, FF2, FF3. The uppermost wave form identified as $d$ represents the distance output pulses on conductor 202, which clock the sequence counter. The first four intervals are combined with the 0 state of FF3 and sequentially combined with the state 1 of FF3 for eight states representing the eight rows. These are also shown in FIG. 4 adjacent to the identified NAND gates.

The output signals from the NAND gates 216, 218, 220, 222 are sent to the NOR gates 35, 35a, etc., which are also supplied with seed signals from conductors 29, 29a, etc., such that the enabled NOR gate supplies the proper seed signal to the seed counter. Thus, considering NAND gate 216, when both of its inputs are at state 1, its output is at state 0. In the scan mode, this takes place after the row 1 count has been completed. Since the output signal from NAND gate 216 is 0, the input to NOR gate 35a for row 2 is also at state 0. NOR gate 35a is on due to the output of amplifier A9. A signal from NAND gate 216 is also sent to NOR gate 35e, but at this time no power is being supplied to NOR gate 35e from amplifier A10, since the input signal from $\bar{Q}$ of flip-flop 3 to A10 is at state 1 so that the output of A10 is at state 0.

With the foregoing state 1 and 0 inputs to NOR gate 35a, input signals from the sensor conductor 29a for row 2 causes a state 0 at the output of NOR gate 35a and a state 1 on conductor 144 to send seed signals from row 2 to the seed counter. Meanwhile, the state 0 signals from NAND gate 216 and from Q of FF3 provides a state 1 output from NOR gate 41 (if power is supplied thereto) to an input of AND gate 37. The other input to AND gate 37 is from the flash multivibrator 43 over conductor 39. Consequently, there is a state 1 output from AND gate 37 to the Schmitt trigger S1 to flash the lamp L1, indicating that the displayed count at the readout device 150 is for row 1. NOR gates 41–41g have power supplied thereto for turn-on through conductor 230. With the Q output of the display flip-flop 176 (FIG. 3B) at state 0, and with the output of amplifier A11 also at state 0, the output of OR gate 232 on conductor 234 to NOR gate 238 is at state 0. The signal on conductor 236 from row switch 206 is also at state 0, which results in a state 1 output for power supply on conductor 230. Thus NOR gate 41, 41a, etc. are powered.

At the end of the seed count for row 2 the distance and area counters 82, 104 are reset and preset as heretofore described and a readout is provided for row 2. The distance counter input pulse on conductor 202 operates the sequence counter 204 for flashing of lamp L2 corresponding to row 2. Also, the seed count from conductor 29b for row 3 will be sent through NOR gate 35b to conductor 144 and to the seed counter. For this purpose it is noted that at this time the output signal on AND gate 218 will apply a state 0 signal to NOR gate 35b so that the seed signal on conductor 29b passes through that NOR gate. The state 0 signal from AND gate 218 is also sent to enabled NOR gate 41a along with the state 0 output from Q of FF3 to cause a state 1 output from NOR gate 41a for input to AND gate 37a. With state 1 on both inputs to AND gate 37a the lamp L2 flashes, indicating a display for row 2.

The sequence counter 204 and its associated circuitry operates to produce outputs on AND gates 216, 218, 220 for sequentially counting and displaying for eight rows. In each instance, the lamp flash NOR gate 41, 41a etc., passes the lamp flash signal for the row count being displayed, as determined by the input state to the associated lamp flash NOR gate from FF3 of sequence counter 204 and from one of the AND gates 216–222. The enabling of the next row count is determined by the input state of the signal to seed signal NOR gates 35, 35a, etc., in conjunction with amplifiers A9 or A10, which are also controlled by the output of the sequence counter to supply power to the gates 35, 35a, etc. The arrangement is such that at any one time during counting and readout, the input logic state and the power supply to the NOR gates 35, 35a, etc. will be such that only the correct NOR gate 35, 35a, etc. will be enabled and at the same time supplied with an activating signal from one of the AND gates 216–220.

The row selector switch 206 may be used to monitor any selected row repeatedly for seed count per acre. Rotating the switch 206 clockwise puts states 0 via the switch contacts on inputs to the NAND gates 209–213 and to certain of the S inputs of the flip-flops of the sequence counter 204, as will be apparent from FIG. 3A. This simply applies to correct logic states to the flip-flops and the NAND gates to drive the sequence counter 204 to a selected row condition and to hold the sequence counter in that state so that it does not sequence for the next row upon receipt of a distance counter input signal on conductor 202. Consequently, for the selected row the seed count signal on the conductor 29, 29a, etc., as the case may be, will deliver its count through its NOR gate 35, 35a, etc., which will be enabled by the setting of the sequence counter from the row selector switch. When the system is operating in the row selection mode, the lamp flashing NOR gates 41, 41a, etc. are disabled. This is accomplished by applying a state 1 pulse on conductor 236 so that the output from NOR gate 238 on conductor 230 is maintained at state 0.

During start-up of the system or with manually changing the row switch 206 from one position to the other, a seed or distance count may be in the counters, and these counters need to be reset so that initial readings will be correct. Therefore, the present invention provides circuitry for resetting the counters and for displaying the seedcount accumulation during the first count interval that follows the start-up or row switch change, as the case may be. As pointed out heretofore, the turn-on of the system is accomplished at terminal 170 (FIG. 3B). This sends a pulse through amplifiers A2, A10 to conductor 242 (See FIGS. 3B and 3C) to apply a reset pulse through diode D6 to conductor 192 to reset the area counter 104. This assures that the first acre count after turn-on will be a full 1/10 acre. The signal output from amplifier A2 is sent to NOR gate 172 along with a state 0 signal from conductor 244. This applies through conductors 174 and 246 a pulse to the display flip-flop 176. This results in the Q output of flip-flop 176 going to state 1 to hold the quad latches in the readthrough state to display the count up. The signal on 174 resets the seed counter 148. The distance counter 82 is also reset so that the first count interval will correspond to 1/200th acre. The waveforms for the foregoing are shown in FIG. 5.

As pointed out above, a state 1 applied to conductor 246 causes Q of flip-flop 176 to go to state 1. In the normal operation after start up Q is at state 0. When Q is at state 1 that state 1 output is applied to an input of AND gate 151. The other input from conductor 153 is at state 0 but will change to state 1 when a distance counter output pulse appears on conductor 140 at the end of the distance interval. This toggles the flip-flop 176 returning its Q to state 0 for normal operation.

When the row select switch 206 is rotated to another position a state 1 pulse appears on conductor 244. With state 1 on conductor 244 a state 0 output pulse from NOR gate 172 appears on conductor 174 for setting the display flip-flop 176 and resetting the counters, as aforesaid. In either the row select mode or at turn-on, the state 1 signal on conductor 234 maintains a state 0 on conductor on 230 to prevent power from being delivered to the lamp flash NOR gates 41, 41a, etc.

In some instances it is desirable to disable the population display, for instance when planting soybeans. This is accomplished by rotating the row selector switch 206 counterclockwise one position from that shown so that a state 0 signal is applied to conductor 248. This signal is applied through amplifier A11 to place a state 1 signal on conductor 250, which turns off the decimal point that is otherwise displayed in the readout device. The signal on conductor 248 also disables the output of each of the decoders. The lamp flash is disabled by reason of a state 1 signal on conductor 234.

For a planter with only four rows, the flip-flop FF3 of sequence counter 204 is disabled. This is done by breaking the connections 260, 262 (FIG. 3A) and adding the ground connections shown adjacent thereto. Since the number of rows used changes the total area covered by the planter, the area counter 104 must be changed in an appropriate ratio. For this purpose the area counter 104 is actuated by the first flip-flop 84 of the counter 82 by way of conductor 135. A "divide by two" function is thus provided for four row operation. The input at 80 is not used, nor is the circuit 263 that consists of the flip-flop, capacitor, amplifier and AND gate shown. In the eight or six row operation conductor 135 is broken at point 270.

For six row operation, the sequence counter 204 is reset after six counts. Connections 260 and 263 are not broken and AND gate 266 is connected as shown in FIG. 3A. For either four or eight row operation, connection 268 is broken to remove the AND gate 266 from the circuit. The circuit 263 is connected in at point 278 (Fig. 3C) to perform a 3/2 divide function for six row operation. The input at conductor 80 for eight rows is not used, and the connection at 270 for four rows is broken. The reset of FF2 and FF3 of the sequence counter is shown in FIG. 4.

The invention is claimed as follows:

1. A seed population monitor for a planter that simultaneously plants a multiplicity of rows of seeds, said monitor comprising sensing means for simultaneously sensing the number of seeds of each row being planted, a first counter responsive to said sensing means for determining a seed count in a row, a readout device for said first counter, a second counter, means for applying input pulses to said second counter as a function of distance traveled by said planter, circuit means associated with said second counter for automatically producing an output signal indicative of area when the planter travels an ascertained distance, and means responsive to said output signal for resetting the first counter and including means for causing said readout device to provide a number that is a measure of the seed population per unit of area being planted over said ascertained distance.

2. A seed population monitor according to claim 1 including means for resetting the second counter for another distance count following the issuance of said output signal.

3. A seed population monitor according to claim 2 including row-selection means for selectively connecting the output of the sensing means for each row to said first counter in sequence for row-by-row counting of the seeds being planted during successive ascertained distances.

4. A seed population monitor according to claim 3 in which said row-selection means is operable for repetitive seed-counting of any selected row during successive ascertained distances.

5. A seed population monitor according to claim 3 in which said row-selection means comprises a sequence counter that is responsive to said second counter output.

6. A seed population monitor according to claim 3 including signalling means associated with each row, and means for actuating the signalling means associated with the row preceding the row in which the seeds are being counted by said first counter.

7. A seed population monitor according to claim 1 including means for signalling a condition indicating that a row is planting seeds at less than a predetermined rate.

8. A seed population monitor according to claim 2 including means for counting the seeds of each row in a sequence, and means for accumulating in said first counter the count of one row while displaying at said read-out device a population read-out for the preceding row.

9. A seed population monitor according to claim 1 further including additional counting means for accumulating a count representing the area traversed by the planter.

10. A seed population monitor according to claim 1 including means for presetting the second counter in accordance with the spacing between the rows of the planter.

11. A seed population monitor according to claim 1, wherein said circuit means is adapted for manually presetting the second counter in accordance with the number of rows in said planter to enable said seed population monitor to be used with said planting apparatus which can plant different number of rows.

12. A seed population monitor for a planter that simultaneously plants a multiplicity of rows of seeds as the planter moves over an area, said monitor comprising means for sensing the seeds of each row being planted, a counter responsive to the sensing means for determining a seed count, a readout device for said counter, circuit means for automatically deriving a signal representative of area as a function of an ascertained distance traveled by said planter, and means responsive to said signal for automatically resetting the counter and including means for causing a direct readout of the seed population per unit of area being planted over said ascertained distance of travel of the planter, said resetting means resetting the counter to receive another seed count for a subsequent ascertained distance while the planter continues in motion such that successive readouts of seed population per unit of area are automatically made over successively ascertained distances which are substantially contiguous.

13. A seed population monitor according to claim 12 further including means for producing said readout for each row of the planter over successive ascertained distances.

14. A seed population monitor according to claim 13 including means for visually indicating the row in which said readout has been produced while at the same time accumulating data for said readout in another row.

15. A seed population monitor according to claim 12 including means for repeating the production of said readout for a selected row over repeating ascertained distances of travel of the planter.

16. A seed population monitor for a planter that simultaneously plants a multiplicity of rows of seeds, said monitor comprising sensing means for sensing the number of seeds of each row being planted, means responsive to said sensing means for sequentially producing a measure of the seed population per unit of area obtained from each row being planted over an ascertained distance of travel of the planter for each row of the planter over successive ascertained distances, optionally operable means for repeating said measure for a selected row, means for selectively presetting said responsive means in accordance with the spacing between rows of the planter, and means for selectively presetting said responsive means in accordance with the number of rows in the planter.

* * * * *